(12) United States Patent
Anning et al.

(10) Patent No.: US 12,123,849 B2
(45) Date of Patent: Oct. 22, 2024

(54) DETECTION / REMOVAL OF METAL CONTAMINATION

(71) Applicant: NOVA Chemicals (International) S.A., Fribourg (CH)

(72) Inventors: Grant Anning, Red Deer (CA); D. Stuart McTaggart, Red Deer (CA); Chris Bysterveld, Red Deer (CA); Antonius De Klerk, Red Deer (CA)

(73) Assignee: NOVA Chemicals (International) S.A., Fribourg (CH)

( * ) Notice: Subject to any disclaimer, the term of this patent is extended or adjusted under 35 U.S.C. 154(b) by 173 days.

(21) Appl. No.: 17/635,596

(22) PCT Filed: Jul. 30, 2020

(86) PCT No.: PCT/IB2020/057229
§ 371 (c)(1),
(2) Date: Feb. 15, 2022

(87) PCT Pub. No.: WO2021/033053
PCT Pub. Date: Feb. 25, 2021

(65) Prior Publication Data
US 2022/0308014 A1    Sep. 29, 2022

(30) Foreign Application Priority Data

Aug. 16, 2019    (CA) .................................. 3052301

(51) Int. Cl.
*G01N 27/74*    (2006.01)
*G01N 15/06*    (2024.01)

(52) U.S. Cl.
CPC ......... *G01N 27/74* (2013.01); *G01N 15/0656* (2013.01)

(58) Field of Classification Search
CPC .. B03B 9/06; Y02W 30/62; B29B 2017/0268; B29B 2017/0272
See application file for complete search history.

(56) References Cited

U.S. PATENT DOCUMENTS

| 4,004,216 A | 1/1977 | Natens et al. | |
|---|---|---|---|
| 5,009,331 A * | 4/1991 | Smith | B07B 13/003 209/940 |
| 6,264,842 B1 * | 7/2001 | Boehm | B03C 1/08 209/213 |
| 2008/0105771 A1 * | 5/2008 | Simon | C10L 5/46 241/24.12 |

(Continued)

FOREIGN PATENT DOCUMENTS

| GB | 2 361 544 | 10/2001 |
|---|---|---|
| JP | 2008110344 A * | 5/2008 |
| JP | 2018-025552 A | 2/2018 |

OTHER PUBLICATIONS

Gmbh Mettler-Toledo, The Metal Detection Guide Building an Effective Programme, Jun. 1, 2016, pp. 1-129, XP055737632.

(Continued)

*Primary Examiner* — Neel D Shah
*Assistant Examiner* — Adam S Clarke
(74) *Attorney, Agent, or Firm* — Thomas J. Styslinger

(57) ABSTRACT

The use of a flow conditioner improves the performance of an electromagnetic system to detect metal contamination in a polymer stream at high flow rates.

8 Claims, 2 Drawing Sheets

(56) References Cited

U.S. PATENT DOCUMENTS

2010/0133152 A1* 6/2010 Taylor .................. B07B 1/4681
  209/675
2018/0229398 A1* 8/2018 Sakimoto ................ C08L 23/12

OTHER PUBLICATIONS

International Search Report and Written Opinion corresponding to PCT/IB2020/057229 dated Apr. 11, 2020, 9 pages.
Intec Minebea: Freefall metal detection system using Vistus with separator FL, Oct. 1, 2017, XP055737640.

* cited by examiner

DETECTION / REMOVAL OF METAL CONTAMINATION

CROSS-REFERENCE TO RELATED PATENT APPLICATIONS

This application is a U.S. National Phase Application under 35 U.S.C. § 371 of International Application No. PCT/IB2020/057229, filed Jul. 30, 2020, which claims the benefit of priority to Canadian Application No. CA 3052301, filed on Aug. 16, 2019, both of which are incorporated herein by reference in their entirety.

TECHNICAL FIELD

This disclosure relates to the detection/removal of metal contamination.

BACKGROUND ART

"World scale" polymer manufacturing facilities can now have production capacities in excess of one billion pounds per year.

The manufacturing process involves contact of the polymer with metal surfaces at many different locations and this can lead to the contamination of the polymer with pieces of metal. The use of an electromagnetic detector in combination with a flow diverter (to divert contaminated polymer out of "prime" finished product) is known. We have discovered that a flow conditioner that improves the distribution of polymer flow and reduces velocity gradients through the detector can optimize the performance of the electromagnetic detector/diverter equipment.

SUMMARY OF INVENTION

In an embodiment, there is provided:

a process for the detection of metal contamination in a polymer stream, said process comprising:

1) introducing said polymer stream into a flow channel that confines said polymer stream;

2) directing said polymer stream into a flow conditioner and thereby producing a conditioned polymer stream;

3) subjecting said conditioned polymer stream to an electromagnetic field;

4) discharging said conditioned polymer stream from said flow channel when no metal contamination is detected by said electromagnetic field; and 5) diverting said conditioned polymer stream to a diversion container when metal contamination is detected by said electromagnetic field.

In another embodiment, an additional permanent magnet system is installed within the polymer flow channel at a position upstream of the flow conditioner.

In another embodiment, an additional permanent magnet system is installed within the polymer flow channel at a position downstream of the flow conditioner.

DESCRIPTION OF EMBODIMENTS

Figure 1:
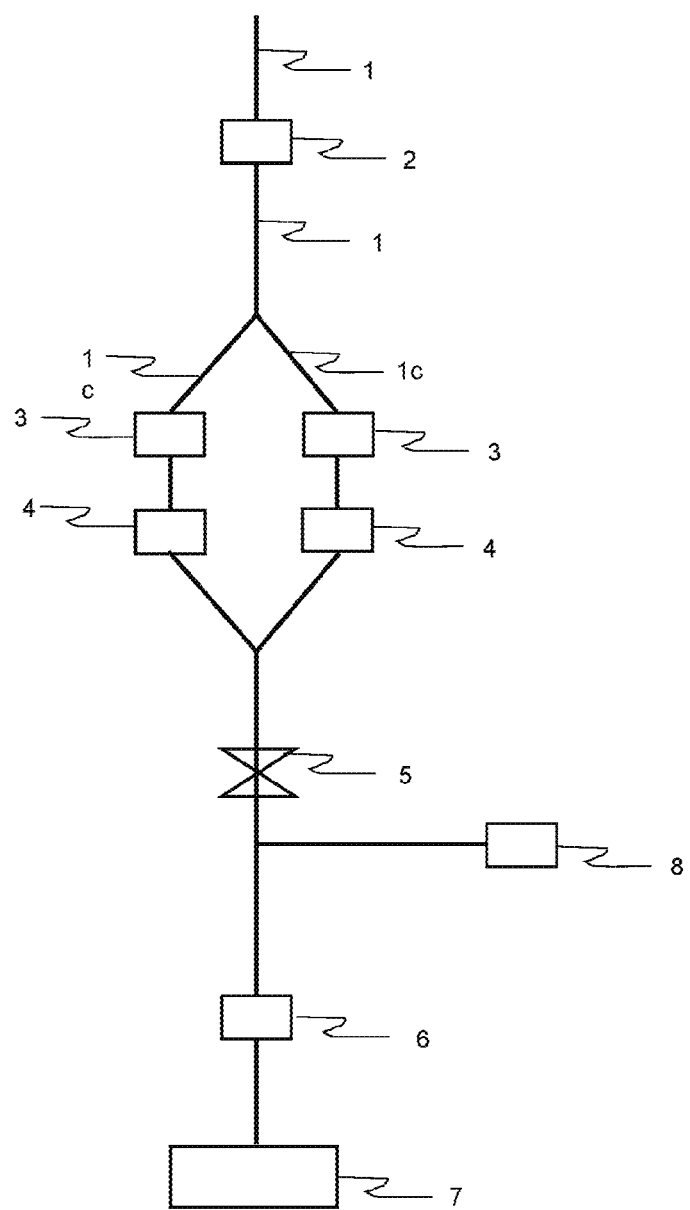
FIG. 1 provides a flow diagram of an embodiment of the process of this disclosure.

FIG. 1 illustrates a flow diagram of a process of this disclosure.

In general, the polymer flows through a flow channel 1 (which flow channel 1 may be a conventional pipe or tube) and is ultimately loaded at the end of the process into a container 7 (which container 7 may, for example, be a rail car).

In an embodiment, the polymer flow is initially subjected to an (optional) permanent magnet 2.

The polymer flow then continues through a flow conditioner 3 that improves the distribution of the polymer flow and reduces surges in the velocity of the polymer flow. The polymer flow then proceeds through an electromagnetic detector 4 (EMD 4) and a flow diverter 5 that is located downstream of the permanent magnet 2. If the EMD 4 does not detect metal contamination, then the polymer flow continues without interruption. In an embodiment, the polymer flow passes through a second permanent magnet 6 that is located just upstream of the container 7. In an embodiment, the container 7 is a rail car.

Conversely, if metal contamination is detected by the EMD 4, then a flow diverter valve 5 is activated and causes the metal contaminated polymer flow to be diverted to a diversion container/sorting station 8. The flow diverter valve 5 is shown in FIG. 1 as a separate part from the electromagnetic detector 4. However, as will be recognized by those skilled in the art, some commercially available electromagnetic detectors are manufactured and sold with the flow diverter valve being an integrated part of the assembly. Manufacturers that presently sell an integrated EMD and flow diverter assembly include Thermo Fisher Scientific Company and Mettler-Toledo.

For clarity, both of the permanent magnets 2 and 6 are optional. These magnets are very effective for the removal of ferritic material. The electromagnetic detector 4 can detect both ferritic and non-ferritic material—but— the activation of the diverter 5 does create a waste stream that contains a comparatively small volume of metal in a much larger volume of polymer. This waste stream needs to be sorted to remove the metal. In contrast, the permanent magnets simply remove metal from the polymer flow.

Part A: Flow Conditioner

The flow conditioner is an essential element. The polymer flow stream is in the form of particles/pieces of polymer—in a typical polyethylene process, these particles may be in the form of cylindrical pellets. It will be recognized that such a polymer flow stream may be subject to "surges", i.e. velocity gradients and/or concentration gradients.

The polymer flow is analyzed by an Electro-Magnetic Detector (EMD, described in Part B, below) and velocity gradients and/or concentration gradients can disrupt the effectiveness of the EMD. For example:

1) if the inlet velocity of the polymer flow to the EMD is too high, then there may be insufficient time to activate the diverter valve when metal is detected (i.e., if the velocity is too high, the metal contamination may have already passed by the diverter valve by the time the diverter valve is actuated); and 2) in general, concentration gradients may reduce the effectiveness of the EMD. In particular, the closer the polymer product flow is to the perimeter of the aperture of the EMD head, the smaller the size of metal particle that may be detected.

The flow conditioner mitigates the problems described in points 1) and 2) above.

Thus, the term "conditioned flow" refers to the polymer flow after it has passed through the flow conditioner so as to smooth/stabilize the flow to provide better flow consistency.

Figure 2:
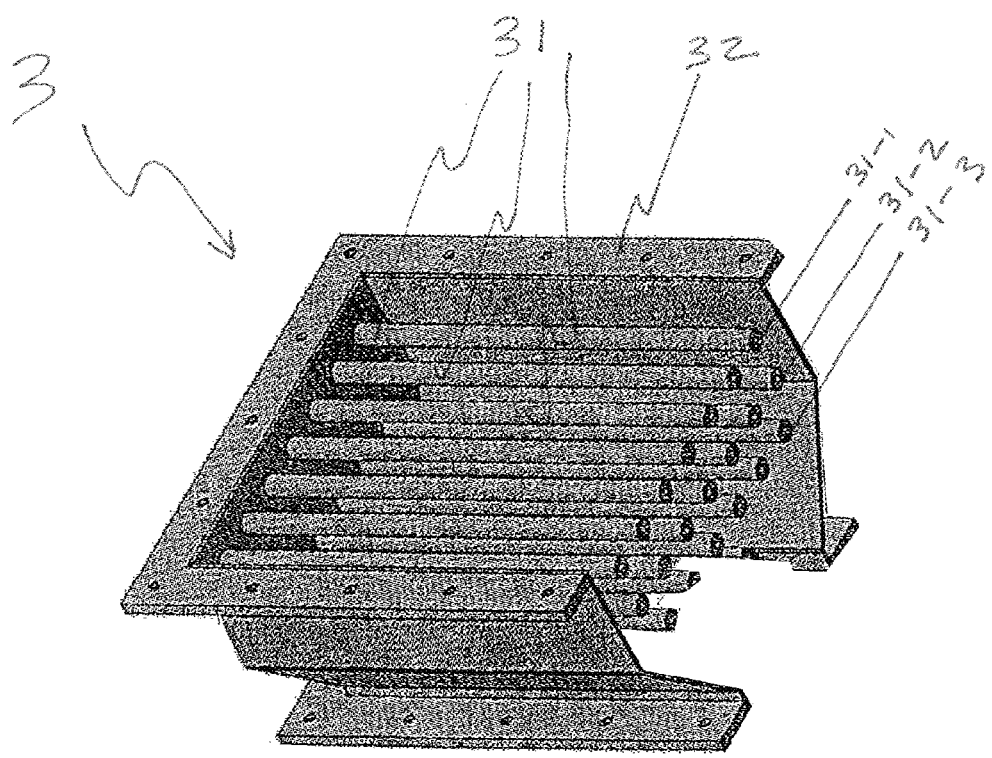
FIG. 2 illustrates a flow conditioner according to this disclosure.

A flow conditioner that is useful in this disclosure is illustrated in FIG. 2. With reference to the numbers in FIG. 1:

The flow conditioner 3 receives the polymer flow via the flow channel 1. The flow conditioner 3 is located just upstream of the EMD 4. In an embodiment, the flow channel 1 is constructed from conventional pipe (having a circular cross section) and the flow conditioner 3 has rectangular cross section shape that cooperates with the inlet of the EMD 4. Thus, in this embodiment, an inlet transition section in the flow channel is designed to connect the circular cross section of the pipe with the rectangular cross section of the flow conditioner 3. In this embodiment, the inlet transition section 1 C is also designed to direct the incoming polymer flow towards the center of the flow conditioner 3.

Referring now to FIG. 2 which provides a cross section of the flow conditioner 3. The flow conditioner 3 comprises a housing 32 and a plurality of bars 31. In the embodiment shown in FIG. 2, three rows of bars are used (as indicated by numbers 31-1; 31-2 and 31-3). The diameter and spacing of the bars cause the velocity of the polymer particles (pellets) to slow down, thereby allowing sufficient time for the diverter valve to activate if metal is detected by the EMD Head. In addition, the arrangement of the bars within the flow conditioner improves the concentration distribution of the polymer pellets within the EMD Head in a manner that improves the effectiveness of the EMD.

Thus, in summary, the bars in the flow conditioner provide two functions:

1) they restrict the flow, thereby mitigating velocity gradients; and
2) they distribute the flow in a more optimum manner (specifically, so as to divert the flow to the perimeter of the EMD aperture, which improves the effectiveness of the EMD to detect small metal particles).

Part B: Electro Magnetic Detector (EMD)

The EMD is also essential. It is possible to simply purchase a suitable EMD— for example, the Thermo Fisher Scientific Company of Minneapolis, Mn, sells a suitable EMD. The capacity of the most commercially available EMD equipment is too small to deal with the full flow of some polymer plants, so it may be necessary to use more than one EMD. This is illustrated in FIG. 1, where two EMD 4 (and two associated flow conditioners) 3 are shown. The EMD works in cooperation with a flow diverter 5. In an embodiment, when the EMD detects metal contamination, a signal from the EMD causes a flow diverter valve to be activated, thereby diverting contaminated polymer out of the "prime product" flow stream. For clarity: the EMD provides an electromagnetic field that is used to identify metal contamination. As previously noted, some manufacturers (including Thermo Fisher Scientific Company) sell an assembly that contains both an EMD and a flow diverter in an integrated assembly.

Part C: Permanent Magnets

The permanent magnets (shown as parts 2 and 6 in FIG. 1) are optional but preferred. Such permanent magnets are readily available items of commerce. The permanent magnets allow ferritic contamination to be removed from the polymer without causing the diversion of the polymer flow—i.e., the contamination is removed from the polymer flow while still allowing the remainder of the clean polymer flow to continue (without diversion).

For clarity: the upstream permanent magnet (part 2 in FIG. 1) is desirable because it can reduce the frequency of EMD "trips" and thereby reduce the size of the waste stream that is generated by "trips".

The downstream permanent magnet (part 6 in FIG. 2) is desirable because it provides a "last line" of detection that does not significantly impact the weighed volume of product flowing to the rail cars.

INDUSTRIAL APPLICABILITY

The present process mitigates metal contamination in the large scale production of plastic, such as polyethylene. The polyethylene that is produced by the process is useful for the preparation of a wide variety of goods including molded parts such as toys; containers; and films for packaging applications.

The invention claimed is:

1. A process for the detection of ferrous and non-ferrous metal contamination in a polymer stream said process comprising:
    1) introducing said polymer stream into a flow channel that confines said polymer stream;
    2) directing said polymer stream into a flow conditioner, the flow conditioner comprising a plurality of bars having a diameter and a spacing to slow the velocity of said polymer stream, and thereby producing a conditioned polymer stream;
    3) subjecting said conditioned polymer stream to an electromagnetic field;
    4) discharging said conditioned polymer stream from said flow channel when no metal contamination is detected by said electromagnetic field; and
    5) diverting said conditioned polymer stream to a diversion container when metal contamination is detected by said electromagnetic field.

2. The process of claim 1 which further contains a permanent magnet system that is located within said flow channel at a position upstream of said flow conditioner.

3. The process of claim 2 which further contains a second permanent magnet system that is located within said flow channel at a position downstream of said flow conditioner.

4. The process of claim 1 wherein said polymer stream flows downwards under the force of gravity.

5. The process of claim 1 wherein said plurality of bars are provided in a first row of bars and at least one additional row of bars.

6. The process of claim 5 wherein said bars are rods having a circular cross sectional shape.

7. The process of claim 1 wherein said polymer flow rate is from 50,000 to 100,000 kilograms/hour (kg/hr).

8. The process of claim 1 wherein said polymer is polyethylene in pellet form.

* * * * *